(12) United States Patent
Brenner

(10) Patent No.: US 7,555,262 B2
(45) Date of Patent: Jun. 30, 2009

(54) RADIO FREQUENCY INTERFERENCE MONITOR

(75) Inventor: Mats A. Brenner, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 982 days.

(21) Appl. No.: 10/667,830

(22) Filed: Sep. 22, 2003

(65) Prior Publication Data

US 2004/0058645 A1    Mar. 25, 2004

Related U.S. Application Data

(60) Provisional application No. 60/413,252, filed on Sep. 24, 2002, provisional application No. 60/413,211, filed on Sep. 24, 2002, provisional application No. 60/413,251, filed on Sep. 24, 2002, provisional application No. 60/413,080, filed on Sep. 24, 2002.

(51) Int. Cl.
    *H04B 7/185* (2006.01)
(52) U.S. Cl. .................. 455/12.1; 455/13.1; 455/427
(58) Field of Classification Search .............. 455/11.1, 455/12.1, 13.1, 427
See application file for complete search history.

(56) References Cited

U.S. PATENT DOCUMENTS

| | | | |
|---|---|---|---|
| 4,218,654 A | | 8/1980 | Ogawa et al. |
| 5,410,750 A | * | 4/1995 | Cantwell et al. ............ 455/306 |
| 5,610,616 A | | 3/1997 | Vallot et al. |
| 5,799,010 A | * | 8/1998 | Lomp et al. ................. 370/335 |
| 5,805,983 A | | 9/1998 | Naidu et al. |
| 5,903,654 A | | 5/1999 | Milton et al. |
| 5,983,160 A | * | 11/1999 | Horslund et al. ............ 701/213 |
| 6,047,017 A | | 4/2000 | Cahn et al. |
| 6,121,923 A | | 9/2000 | King |
| 6,160,861 A | | 12/2000 | McCollough |
| 6,219,373 B1 | | 4/2001 | Lee et al. |
| 6,295,024 B1 | | 9/2001 | King et al. |
| 6,313,789 B1 | | 11/2001 | Zhodzishsky et al. |
| 6,331,835 B1 | | 12/2001 | Gustafson et al. |

(Continued)

FOREIGN PATENT DOCUMENTS

EP            0436854        7/1991

(Continued)

OTHER PUBLICATIONS

"Category I Local Area Augmentation System Ground Facility", Specification FAA-E- 2937 A; United States Department of Transportation Federal Aviation Administration, Apr. 17, 2002.

(Continued)

*Primary Examiner*—Nay A. Maung
*Assistant Examiner*—Tuan H Nguyen
(74) *Attorney, Agent, or Firm*—Fogg & Powers LLC

(57) ABSTRACT

A method for monitoring radio frequency interference (RFI) in a pass band of a satellite signal is provided. The satellite signal includes a carrier signal tracked by a carrier tracking loop located at a receiver. The method involves calculating a statistical variance estimate based on a plurality of discriminator values formed in the carrier tracking loop and calculating an RFI detector from the statistical variance estimate. The method is particularly useful for detecting continuous wave (CW) and narrowband RF interfering signals in the tracking loop pass band.

44 Claims, 4 Drawing Sheets

U.S. PATENT DOCUMENTS

| | | | |
|---|---|---|---|
| 6,384,774 | B1 | 5/2002 | Mutoh et al. |
| 6,407,699 | B1 | 6/2002 | Yang |
| 6,587,075 | B1 | 7/2003 | Loh et al. |
| 6,611,795 | B2* | 8/2003 | Cooper .................. 702/191 |
| 6,684,061 | B1* | 1/2004 | Yost .................. 455/67.11 |
| 2003/0073436 | A1* | 4/2003 | Karabinis et al. ........... 455/429 |

FOREIGN PATENT DOCUMENTS

| | | |
|---|---|---|
| EP | 0582233 | 9/1994 |
| EP | 1 102 415 | * 5/2001 |
| EP | 1 102 415 A2 | 5/2001 |
| EP | 1114663 | 7/2001 |
| EP | 1182796 | 2/2002 |
| WO | 005778 | 10/2000 |
| WO | 0139698 | 6/2001 |
| WO | 0239136 | 5/2002 |

OTHER PUBLICATIONS

Ward, Phillip, "Effects of RF Interference On GPS Satellite Signal Receiver Tracking," Understanding GPS Principles and Applications, Chapter 6, pp. 209-236, 1996.

Jakab, A., "An Approach to GPS Satellite Failure Detection," NovAtel Inc.

Hartman, Randy, "LAAS Government Industry Partnership (GIP)," Honeywell International Inc.

Hartman, Randy, "Precision Approach Using Differential GPS," Honeywell International Inc.

Ray, J.K., et al., "Characterization of GPS Carrier Phase Multipath," Department of Geomatics Engineering, university of Calgary, Alberta, Canada, ION NTM-99, San Diego, Jan. 25-27, 1999.

Maurer, M. et al., "Advanced Receiver Technology For Existing and Future Satellite Navigation Systems," International Journal of Satellite Communications, 2000; 18: pp. 347-364.

Upadhyay, Triveni et al., "Test Results on Mitigation of SATCOM-Induced Interference to GPS Operation," http://www1.faa.gov/and/and300/datalink/dlsys/satcom.htm, printed Feb. 4, 2003.

"About the Radio Frequency Interference Monitoring System (RFIMS)," Institute For Telecommunications Sciences, http//www.its.bldrdoc.gov/home/programs/rfims/rfims.html, printed May 2003.

Legrand, Fabrice et al., "Real-Time Minimization of the Total Tracking Error In Phase and Delay Lock Loops—A Second Approach of the Fast Adaptive Bandwidth Algorithm," http://www.recherche.enac.fr/Itst/papers/ion_am_01.pdf, printed May 2003.

Saarnisaari, Harri, "Phase Interference Extractor Interference Canceller In DS/SS Code Synchronization," http://www.cwc.oulu.fi/home/projects/AWICS/awics_pub/2003/harri_saarnisaari_euroco00.pdf, printed Mar. 17, 2003.

Landry, Rene Jr. et al., "Analysis of Potential Interference Sources and Assessment of Present Solutions For GPS/GNSS Receivers," 4th Saint-Petersburg on INS, May 26-28, 1997.

Ali-Ahmad, Walid, Ph.D., "RF System Issues Related to CDMA Receiver Specifications," RF Standards, Sep. 1999.

"Adaptive Interference Cancellation : The Latest Weapon Against Interference," http://www.cyberrf.com/appnote/canc/cancAppnote2.htm, printed Feb. 4, 2003, pp. 1-5.

Butsch, Felix, "Innovation: A Growing Concern Radiofrequency Interference and GPS," GPS World, Oct. 2002.

Macabiau, Christophe et al., "Use of MultiCorrelator Techniques For Interference Detection," http://www.recherche.enac.fr/Itst/papers/ion_ntm_2001_interf.pdf, printed Mar. 17, 2003.

Bastide, Frederic et al., "GPS Interference Detection and Identification Using Multicorrelator Receivers," http://www.recherche.enac.fr/ext/Itst/papers/ion_gps_01.pdf, printed on Mar. 10, 2003.

Maenpa, Jon E. et al., "New Interference Rejection Technology From Leica," Leica Geosystems Inc., Sep. 1997.

R. Braff et al., "Derivation of ranging source integrity requirements for the Local Area Augmentation System (LAAS)", "Journal of the Institute of Navigation", 2000-2001, pp. 279-288, vol. 47, No. 4, Publisher: Navigation, Published in: US.

C.J. Comp et al., "Adaptive SNR-Based Carrier Phase Multipath Mitigation Technique", "IEEE Transactions on Aerospace and Electronic Systems", Jan. 1998, pp. 264-276, vol. 34, No. 1, Publisher: IEEE, Published in: US.

F. Legrand et al., "Real-Time Minimization of the Total Tracking Error in Phase and Delay Lock Loops-a Second Approach of the Fast Adaptive", Jan. 2002, pp. 37-46, vol. 50, No. 197, Publisher: Navigation, Published in: France.

B.W. Parkinson et al., "Global Positioning System: Theory and Applications", 1996, pp. 390-394, vol. 1, Publisher: American Institute of Aeronautics and Astronautics, Inc., Published in: US.

J.K. Ray et al., "GPS Code and Carrier Multipath Mitigation Using a Multiantenna System", "IEEE Transactions on Aerospace and Electronic Systems", Jan. 2001, pp. 183-195, vol. 37, No. 1, Publisher: IEEE, Published in: US.

Ober, P.B. et al., "The Suitability of GPS For Basic Area Navigation," 10th International Technical Meeting of the Satellite Division of the Institute of Navigation, ION GPS-97, Sep. 16-19, 1997.

Volpe, John A., "Vulnerability Assessment of the Transportation Infrastructure Relying On the Global Positioning System," Final Report, U.S. Department of Transportation, Aug. 29, 2001.

Gromov, Konstantin, "GIDL: Generalized Interference Detection and Localization System," Dissertation submitted to the Department of Aeronautics and Astronautics and the Committee on Graduate Studies of Stanford University in partial fulfillment of the requirements for the degree of Doctor of Philosophy, Mar. 2002.

Phlets, Robert Eric, "Multicorrelator Techniques For Robust Mitigation of Threats to GPS Signal Quality," A dissertation submitted to the department of mechanical engineering and the committee of graduate studies of Stanford University in partial fulfillment of the requirements for the degree of Doctor of Philosophy, Jun. 2001.

* cited by examiner

RADIO FREQUENCY INTERFERENCE MONITOR

PRIORITY

The present patent application claims priority under 35 U.S.C. § 119(e) to the following U.S. Provisional Patent Applications, the full disclosures of which are each incorporated herein by reference:

U.S. Provisional Patent Application Ser. No. 60/413,080; filed on Sep. 24, 2002, entitled "Radio Frequency Interference Monitor," to Brenner.

U.S. Provisional Patent Application Ser. No. 60/413,252; filed on Sep. 24, 2002, entitled "Signal Deformation Monitor," to Brenner.

U.S. Provisional Patent Application Ser. No. 60/413,211; filed on Sep. 24, 2002, entitled "Low Power Detection and Compensation for Satellite Systems," to Brenner.

U.S. Provisional Patent Application Ser. No. 60/413,251; filed on Sep. 24, 2002, entitled "Dual Antenna Adaptive Compensation Algorithm," to Brenner et al.

RELATED APPLICATIONS

This application is related to the following concurrently filed U.S. Applications, which are incorporated by reference herein:

U.S. patent application Ser. No. 60/413,252; filed on Sep. 24, 2002, entitled "Signal Deformation Monitor," to Brenner.

U.S. patent application Ser. No. 60/413,211; filed on Sep. 24, 2002, entitled "Low Power Detection and Compensation for Satellite Systems," to Brenner.

U.S. patent application Ser. No. 60/413,251; filed on Sep. 24, 2002, entitled "Dual Antenna Adaptive Compensation Algorithm," to Brenner et al.

FIELD OF INVENTION

The present invention relates generally to satellite systems, and more particularly, relates to monitoring and detecting continuous wave and narrowband radio frequency interference in a satellite signal pass band.

BACKGROUND

Satellite-based positioning systems, such as the Global Positioning System (GPS) and the Global Navigation System Satellite System (GLONASS), have gained a widespread use in many navigation applications. Another example is the planned European system Galileo. These systems utilize a number of orbiting satellites that continuously transmit radio frequency (RF) carrier signals modulated by navigation data and by pseudorandom noise (PRN) digital codes. The navigation data contains satellite ephemeris data describing orbital position of a satellite and other system information. A receiver uses the navigation data to determine the location of the satellite at the time of signal transmission. In addition, by measuring a propagation time, or a transit time, of the satellite signal, the receiver can calculate a range to the satellite.

This satellite-to-receiver range, also known as a pseudorange, is based on measuring the phase offset between the satellite PRN code phase and a replica code generated at the receiver. The phase by which the replica code must be shifted in the receiver to maintain maximum correlation with the satellite code (i.e., approximate propagation time of the signal), multiplied by the speed of light, is approximately equal to the satellite range. For more precise range determination, some receivers derive carrier phase measurements by comparing the phase of the satellite's carrier signal with a phase of an oscillator located within the receiver at an epoch of measurement.

A typical receiver tracks at least four selected satellite signals. With information about the location of each tracked satellite and the pseudorange to each tracked satellite, the receiver can then precisely determine its own three-dimensional position (i.e., latitude, longitude, and altitude), velocity, and local time. For more accurate position determination, two or more receivers may be used together to derive corrections, known as differential corrections. A system using two or more receivers is referred to as a differential system, such as a differential GPS (DGPS) or a differential GLONASS.

Improved accuracy performance allowed the use of satellite-based systems in various aspects of the transportation infrastructure, such as an aviation infrastructure. In commercial aircraft navigation and guidance, satellite-based positioning systems have traditionally been used only for determining position of an aircraft during non-critical portions of a flight, that is, between takeoff and landing. However, in recent years, researchers have started extending these systems for use during landings.

These extended systems have taken the form of ground-augmented systems. Two primary systems that are currently under development are Wide Area Augmentation System (WAAS), which can be used for aircraft en-route navigation and non-precision approaches, and a Local Area Augmentation System (LAAS) that primarily targets precision navigation for landing. The LAAS uses a DGPS, consisting of multiple ground-based reference GPS receivers, a processing station, and a Very High Frequency (VHF) data transmitter.

The ground-based reference GPS receivers, each with a known position, work as normal GPS receivers in determining respective sets of pseudoranges based on signals from at least four satellites. These pseudoranges are fed to the ground-based processing station, which uses the difference between each reference receiver's known position and its satellite-derived position to determine differential corrections. The correction data is then transmitted to an aircraft approaching the landing area via the VHF data link.

The approaching aircraft uses the correction data to correct position estimates of on-board GPS receivers, providing better position solutions than possible using its on-board GPS receivers alone. These corrected position solutions are then compared to a reference-landing path to determine course deviations necessary to ensure the aircraft follows the reference-landing path.

To provide precision approach and landing capabilities, satellite-based navigational systems must adhere to stringent performance requirements such as accuracy, integrity, continuity, and availability of the service. In 1998, Federal Aviation Administration (FAA) initiated a program to establish requirements for developing and deploying a LAAS Ground Facility (LGF). The LGF will monitor the satellite constellation, provide the LAAS corrections and integrity data, and provide approach data to and interface with air traffic control. As a result of this program, the FAA released Specification FAA-E-2937A for a Category I LGF on Apr. 17, 2002, the contents of which are incorporated by reference.

Unfortunately, satellite signals are characterized by low power levels, which make them susceptible to atmospheric disturbances, thermal noise of a receiver, signal blockage, multipath effects, and primarily radio frequency interference (RFI). In fact, the LGF specification has identified the RFI above normal levels as a threat to the LGF that must be handled to ensure accuracy and integrity (i.e., the ability of the system to provide timely warnings to users when the system should not be used for navigation purposes as a result of errors or failures in the system) of the LAAS.

Typically, GPS satellites transmit using two carrier frequencies called L1 (1575.42 MHz), the primary frequency, and L2 (1227.6 MHz), the secondary frequency. Using a spread-spectrum technique called code division multiple access (CDMA), the carrier frequencies are modulated by a unique PRN ranging code sequence assigned to each satellite. In contrast, GLONASS employs a technique called frequency division multiple access (FDMA), in which all satellites transmit the same ranging codes but on different carrier frequencies.

Because satellite-based positioning systems utilize RF carrier signals for transmission of satellite navigation data, the receivers also become susceptible to external RFI signals. The RFI can cause degradation in navigation accuracy or complete loss of receiver tracking. For instance, a GPS receiver can lose lock on a satellite signal due to an interfering RF signal that is only a few orders of magnitude stronger than the minimum received signal strength. To resume tracking, the power of the interferer must be reduced below the tracking threshold of the receiver. Also, during acquisition, when the receiver tries to synchronize its code replica with the received signal, the receiver is susceptible to RFI.

Most of the RFI will come from unintentional, out-of-band sources that can be filtered by a passive filtering in a front-end of the receiver. However, any in-band interference, i.e., the interference that falls within a pass band of a satellite signal, will pass through the front-end of the receiver and may possibly "leak" into the tracking loop pass band, posing a threat to the signal integrity.

Depending on its bandwidth, RFI can be categorized as broadband (wideband), narrowband, or continuous wave (CW). In addition, interference may be pulsed or continuous. Broadband RFI has a flat power spectral density over a wide range of frequencies including GPS L1 band, 1563 through 1587 MHz. Narrowband signals are signals that occupy a small bandwidth (usually less than 500 kHz) centered at a specified carrier frequency. CW signals are also narrowband signals that are modeled a single tone carriers at a specified frequency.

Generally, broadband in-band RFI can be modeled as a white noise with a constant power spectrum density for all frequencies in a satellite signal bandwidth and can be detected by monitoring a signal-to-noise ratio (SNR) at a receiver. Due to the nature of spread-spectrum systems, modulating the satellite with a PRN code results in spreading of the carrier over a large bandwidth. As a result, the received GPS signal combines with the thermal noise of the receiver.

As long as the RFI remains below the thermal noise of the receiver, it will not have significant impact on the performance of the receiver. However, CW and narrowband RFI do not have a constant power spectrum density and are not readily detected by monitoring the SNR. As a result, these signals might "leak" into a tracking pass band of the receiver, severely affecting tracking reliability. It would be beneficial, therefore, to monitor the CW and narrowband RFI present in the tracking loop pass band.

SUMMARY

In accordance with the present invention, a method for monitoring radio frequency interference (RFI) in a satellite signal is provided. The RFI may comprise CW RFI and/or narrowband RFI. In one embodiment, the satellite signal includes a carrier signal tracked by a carrier tracking loop such as a phase-locked loop (PLL). The method includes calculating a statistical variance estimate based a plurality of discriminator values formed in the carrier tracking loop and calculating an RFI detector from the statistical variance estimate. The RFI detector may be calculated as a square root value of the statistical variance estimate. Alternatively, the RFI detector may be defined as a root-mean-square (RMS) of the discriminator value.

The method may further include comparing the RFI detector to a threshold value and determining if the RFI detector exceeds the threshold value to determine if a loss of lock or a cycle slip occurred in the carrier tracking loop due to the RFI.

These as well as other features and advantages will become apparent by reading the following detailed description, with appropriate reference to the accompanying drawings.

BRIEF DESCRIPTION OF FIGURES

Presently preferred embodiments are described below in conjunction with the appended drawing figures, wherein like reference numerals refer to like elements in the various figures, and wherein.

DETAILED DESCRIPTION

Figure 1:
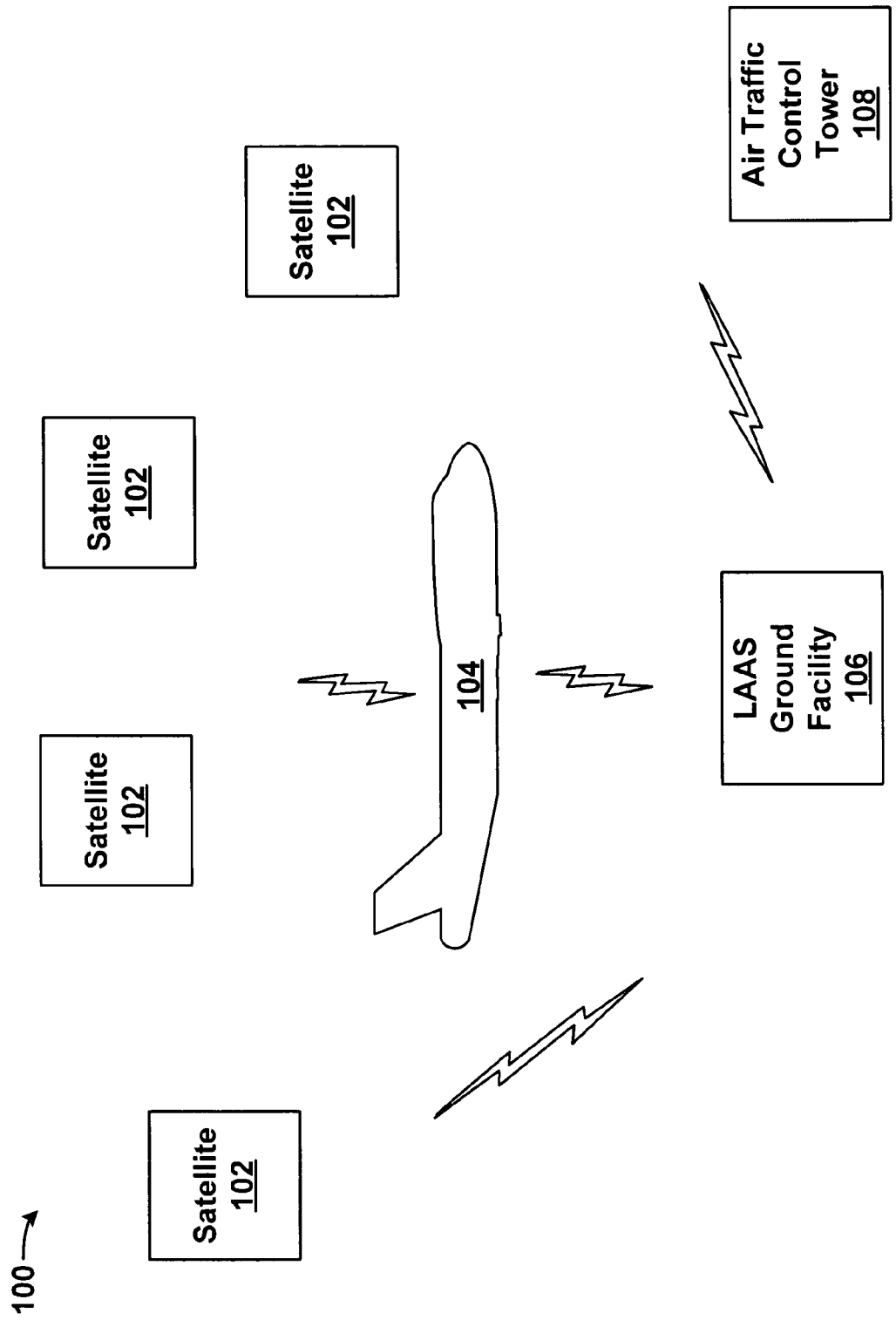
FIG. 1 is a block diagram illustrating a Local Area Augmentation System (LAAS), in which an exemplary embodiment of the present invention can be implemented.

Referring to the drawings, FIG. 1 illustrates a simplified block diagram of a LAAS 100, in which an exemplary embodiment of the present invention can be implemented.

It should be understood, however, that the LAAS 100 in FIG. 1 and other arrangements described herein are set forth for purposes of example only, and other arrangements and elements can be used instead and some elements may be omitted altogether. Further, those skilled in the art will appreciate that many of the elements described herein are functional entities that may be implemented as discrete components or in conjunction with other components, in any suitable combination and location, and various functions could be carried out by software, firmware and/or hardware logic.

As shown in FIG. 1, the LAAS 100 includes a plurality of satellites 102, of which four exemplary satellites are shown, and a LAAS Ground Facility (LGF) 106 for providing precision approach data and landing capability to an aircraft 104. The plurality of satellites 102 may include any of the GPS satellites currently orbiting the earth and any new satellites that are installed in the future.

The plurality of satellites 102 provide the aircraft 104 and the LGF 106 with GPS ranging signals and orbital parameters. The aircraft 104 uses on-board GPS receiver(s) (not shown) to receive the ranging signals and to calculate an estimate of its position. In turn, the LGF 106 may provide differential corrections, integrity parameters, and precision approach pathpoint data to the aircraft 104. The aircraft 104 may apply the LGF corrections to the GPS ranging signals to accurately determine its position.

Communication between the LGF 104 and the aircraft 106 may be conducted using a VHF data broadcast, for example. In addition, the LGF 106 may provide status information to air traffic control tower 108 via an Air Traffic Control Unit (ATCU) (not shown).

Figure 2:
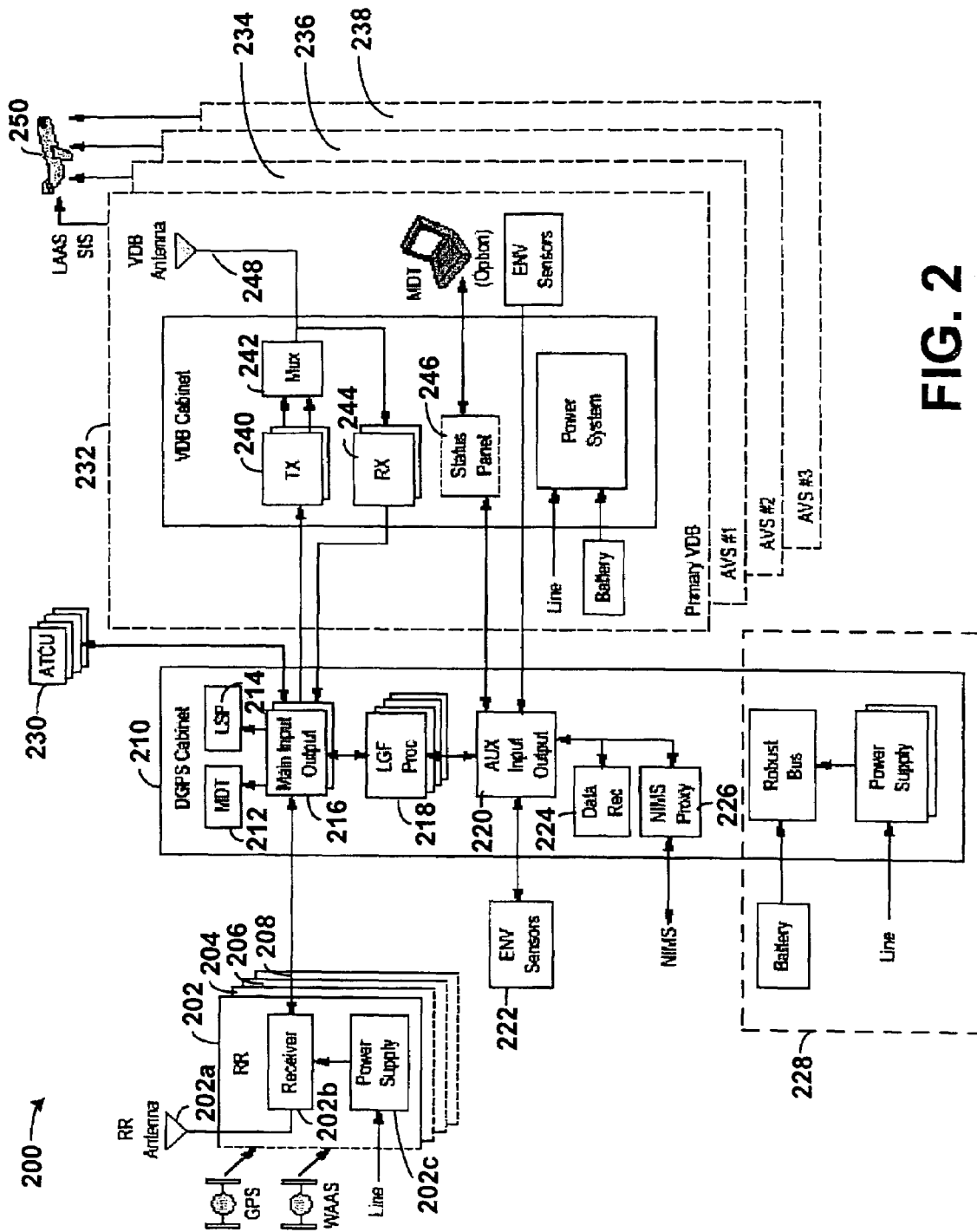
FIG. 2 is a block diagram illustrating one example of a Local Area Augmentation System Ground Facility (LGF), according to an exemplary embodiment.

FIG. 2 illustrates in greater detail a representative LGF 200. The LGF 200 includes a plurality of reference receivers, of which exemplary RR 202, RR 204, RR 206, and RR 208 are shown, coupled to a DGPS cabinet 210. The exemplary RR 202 comprises an antenna system 202*a*, a receiver 202*b*, and a power supply 202*c*. The RR 202, 204, 206, and 208 receive signals transmitted from GPS space vehicles in view, such as the satellites 102 for instance. The reference receivers may possibly receive signals from WAAS satellites as well.

Each of the exemplary reference receivers collects GPS measurements and transmits the measurements to the DGPS cabinet 210, via cable or a wireless modem for example. The measurements may include satellite position and status, pseudorange measurements and/or carrier phase measurements, and measurement time. The use of redundant reference receivers in the LGF 200 may increase the accuracy of the differential corrections provided by the LGF 200. In addition, fault detection and isolation of a failed reference receiver may be performed.

As shown in FIG. 2, the DGPS 210 may include a Mobile Data Terminal (MDT) 212 and a Local Status Panel (LSP) 214 coupled to a main input/output 216. The MDT 212 may be an interface to the LGF 200 to allow on-site maintenance (e.g., troubleshooting and running system diagnostics) and system control (e.g., a display of all alert, alarm and/or fault messages generated by the LGF 200). The LSP, in turn, may provide a visual indication of the operational status of the LGF 200. The LSP may activate a green indicator when the LGF 200 is in normal operating mode and a red indicator when the LGF 200 is not available for operation due to an alarm for instance.

The DGPS 210 may also include a LGF processing unit 218 coupled to an auxiliary input/output 220, which, in turn, may be coupled to Environmental Management (ENV) sensors 222, data recorder 224, and NIMS processing equipment 226. The data recorder 224 may use a non-volatile memory to store system data (e.g., data transmitted to the DGPS 210 by the reference receivers) and/or information about system events, such as when the LGF 200 experiences problems or failures.

The LGF processing unit 218 of the DGPS 210 may function to provide differential corrections for each valid satellite signal and to perform integrity processing and automatic integrity check. The LGF processing unit 218 may comprise a plurality of dedicated processors (e.g., a differential correction processor and an integrity monitor processor) to perform these functions.

To compute differential corrections, the LGF processing unit 218 calculates a range to a given satellite based on the precisely surveyed RR 202, 204, 206, and 208 station antenna locations and the satellite position, and then differences the calculated range with the pseudorange values sent from the reference receivers. The LGF processing unit 18 may execute integrity processing to exclude any pseudorange values that are unusable due to unacceptable errors. Once the corrections are computed, an integrity check is performed on the generated correction messages to help ensure that the messages will not produce misleading information for the users.

As further shown in FIG. 2, the DGPS 210 may also include a power supply 228 that comprises a battery and/or an input power line. Furthermore, the DGPS 210 may couple to an ATCU 230, a primary Very High Frequency Broadcast (VDB) cabinet 232 and a plurality of additional VDB cabinets such as Additional Very High Frequency Data Broadcast Subsystems (AVS) 234, 236, and 238, all coupled to the DGPS 210.

Exemplary VDB 232 comprises transmitters 240 coupled to a multiplexer 242, receivers 244, and a status panel 246. The multiplexer 242 and receivers 244 are coupled to a VDB antenna 248. The VDB antenna 248 broadcasts LGF data modulated onto VHF carrier signals to an airborne user 250. The LGF data may include a differential correction message, along with suitable integrity parameters and approach path information.

The airborne user 250 may be an aircraft, such as the aircraft 104, that includes airborne receivers (e.g., a VHF receiver and a GPS receiver) to receive data transmitted from the LGF 200 and to compute more accurate position of the aircraft using the same data. In particular, a GPS receiver on board the aircraft may provide more accurate position solution by applying the LGF corrections to its range measurements.

Once the position is computed, any errors between the aircraft position and a desired approach path may also be determined. The errors can be converted to a suitable form (e.g. as an angular displacement) and transmitted to the aircraft's autopilot and cockpit displays to assist the autopilot and/or a pilot in steering the aircraft onto the desired approach path. However, if the LGF 200 is operating within an RFI environment that includes CW and/or narrowband interferers, it is possible that the LGF 200 may be transmitting inaccurate data that may result in position and navigational errors of the aircraft.

In one example, the antenna system 202*a* depicted in FIG. 2 may capture GPS satellite signals and possibly RFI signals emitted from CW RFI sources and/or narrowband RFI sources operating in the vicinity of the exemplary RR 202. Of course it is equally possible that any or all of the plurality of reference receivers of the LGF 200 may be affected by RFI emissions as well. The received satellite signals may be applied to a passive bandpass filter in a front-end of the receiver 202*b* to attenuate out-of-band RFI. Any in-band RFI signals not attenuated by the filter, however, may pass into the satellite signal pass band.

As known in the art, the satellite signals may be amplified by a low-noise preamplifier and then down converted from a GPS frequency (e.g., L1 carrier frequency at 1575.42 MHz or L2 frequency at 1227.6 MHz) to a lower intermediate frequency (IF) at several MHz (e.g., 21.4 MHz). If the receiver 202*b* is a digital receiver, the IF signal may be sampled and digitized by an analog-to-digital (A/D) converter prior to signal processing in a tracking channel of the receiver.

The receiver 202*b* may comprise multiple channels to simultaneously track signals from a plurality of satellites. Each channel tracks one satellite signal as received by the antenna system 202*a*. Typically, the receiver includes five to twenty four tracking channels, but may include fewer or more depending on its design. Each tracking channel includes a tracking loop, which comprises a code tracking loop and a carrier tracking loop.

The code tracking loop operates to keep the incoming satellite PRN code synchronized in phase with a replica PRN code generated at the receiver 202*b*. The carrier tracking loop, in turn, synchronizes the incoming satellite carrier signal in phase and/or frequency with a replica carrier signal. However, if the receiver 202*b* loses carrier synchronization (i.e., the carrier tracking loop loses lock) due to CW RFI and/or narrowband RFI present in the tracking loop pass band, it will eventually lose the code track as well.

Figure 3:
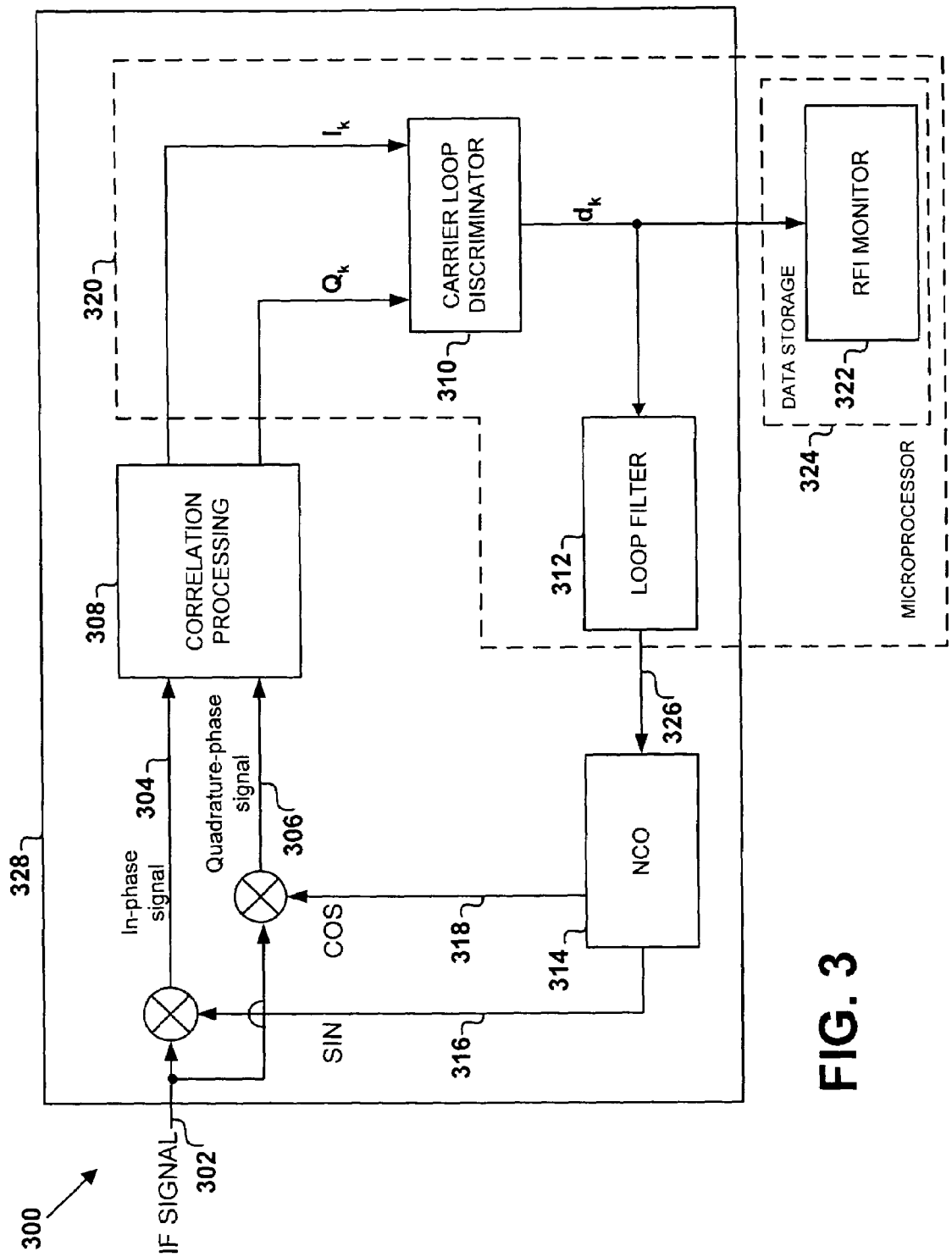
FIG. 3 is a block diagram illustrating an exemplary carrier tracking system.

FIG. 3 illustrates exemplary carrier tracking system 300 arranged to perform the functions described herein. This example arrangement assumes a closed-loop carrier tracking operation for a single receiver channel. It should be understood, however, that the method of the present invention can be implemented in any or in each tracking channel of the receiver such as the exemplary receiver 202b.

As shown in FIG. 3, the carrier tracking system 300 includes a carrier tracking loop 328 and an RFI monitor 322. The carrier tracking loop 328 may further comprise a correlation processing module 308, a carrier loop discriminator 310, a loop filter 312, and a Numerically Controlled Oscillator (NCO) 314.

The carrier tracking loop 328 may be implemented using digital components and/or analog components. For example, in the analog implementation of the system, the functions of the NCO 314 may be carried out by a voltage-controlled oscillator (VCO). In a preferred embodiment, the carrier tracking loop 328 is implemented using digital components.

Further, some functions may be implemented in a custom chip such as Application-Specific Integrated Circuit (ASIC), while others may be implemented in a general-purpose processor or a combination of dedicated processors. In a typical digital design, the functions associated with loop control, such as discriminator computations and loop filtering are firmware-based and are performed by a high-speed microprocessor such as microprocessor 320 depicted in FIG. 3.

In addition to signal tracking functions, the exemplary microprocessor 320 may execute other receiver functions such as signal acquisition, SNR estimation, navigation data demodulation, navigational processing (e.g., pseudorange measurements and/or carrier phase measurements), and computation of a Position, Velocity, and Time (PVT) solution.

As depicted in FIG. 3, a (digitized) satellite signal 302 at IF is mixed with an output from a Numerically Controlled Oscillator (NCO) 314. The NCO 314 produces a replica carrier signal in quadrature format. More particularly, the NCO 314 outputs a discrete staircase function that is mapped into a replica sine signal 316 and a replica cosine signal 318. If the carrier tracking loop 328 uses a coherent tracking structure (i.e., the loop tracks the phase of the satellite signal 302), the respective signals 316 and 318 are mixed with the satellite signal 302 to produce an in-phase signal 304 and a quadrature-phase signal 306.

The carrier tracking loop 328 may also be incoherent (i.e., the replica carrier signal generated by the NCO 314 may not be necessarily synchronized in phase with the satellite signal 302). However, as defined in this document, the quadrature or orthogonal components of the IF signal 302 produced by quadrature mixing will be generally referred to as "in-phase" and "quadrature-phase" components.

The correlation processing module 308 functions to remove the spreading PRN code sequence from the in-phase and quadrature-phase signals 304 and 306 by multiplying the signals with a prompt replica PRN code (i.e., a replica code that is aligned in phase with the satellite PRN code when a code tracking loop is locked) and then integrating (or accumulating) the multiplication products to form a correlation integral, which equals unity when the two codes are synchronized. The resulting in-phase and quadrature-phase components, denoted as $I_k$ and $Q_k$ respectively, are then fed into the carrier loop discriminator 306.

To generate $I_k$ and $Q_k$, the integration function of the correlation processing module 308 may be executed over one code period of T seconds or several code periods. For example, the correlation processing module 308 generates in-phase and quadrature-phase measurements every T seconds (or at a code epoch) and may average M of these measurements to form $I_k$ and $Q_k$ components every MT seconds (i.e., the $I_k$ and $Q_k$ are sampled at t=kMT).

T will generally depend on a code rate of a PRN code used to modulate a satellite signal. In a GPS receiver, T is typically 1 ms or 0.001 seconds, which is approximately equivalent to a period of a 1.023 MHz C/A (Coarse/Acquisition) PRN code modulated onto L1 and L2 carrier signals. For T=0.001 seconds, M is typically in the range of 1-20, but may be possibly greater than 20. For the purposes of the present invention, however, the particular duration of the MT is not critical. In a preferred embodiment, M is 10.

According to an exemplary embodiment, a discriminator ($d_k$) is formed in the carrier loop discriminator 310 every MT seconds from the in-phase and quadrature-phase components $I_k$ and $Q_k$ valid at the time kMT. The discriminator $d_k$ can be formed in any of a variety of ways. The method of forming the discriminator may depend on the type of the carrier tracking loop.

For example, the carrier tracking loop 328 may be a phase-locked loop (PLL), a Costas PLL (i.e., a type of PLL that tolerates the presence of data modulation on $I_k$ and $Q_k$ signals) or a frequency-locked loop (FLL). The PLL tracks the phase and thus the exact frequency of a satellite signal (i.e., coherent tracking), while the FLL tracks an approximate frequency of the satellite signal (i.e., an incoherent tracking).

It is also possible to use a combination of both the PLL and the FLL. For instance, a receiver may implement a FLL-assisted PLL, which may utilize the FLL operation during high-stress dynamic conditions (e.g., acceleration or jerks) when the loop frequency errors are large and then transition back to the PLL operation. That is, if a satellite carrier signal and a replica carrier signal are wide apart in frequency, the loop may be first locked in frequency using the FLL and then perform the final phase lock using the PLL. In this case, the discriminator may be formed for each mode of operation of the carrier tracking loop.

The discriminator may be formed by one of the following algorithms executed in the microprocessor 320:

$$d_k = I_{k-1} Q_k - I_k Q_{k-1} \text{(FLL)} \quad \text{(Equation 1)}$$

$$d_k = Q_k \sin(I_k) \text{(PLL)} \quad \text{(Equation 2)}$$

$$d_k = \arctan(I_k, Q_k) \text{(PLL)} \quad \text{(Equation 3)}$$

However, other algorithms may be used instead and may depend on a receiver design and/or vendor's preferences. The value of the $d_k$ will be typically expressed in radians (rad), but may be expressed in Hertz (Hz) as well.

In general, any phase and/or frequency error (or misalignment) between a replica carrier and an incoming satellite carrier signal produces a nonzero phase angle of the phasor (or the vector sum) formed from the $I_k$ and $Q_k$ components. The value of the $d_k$ produced by the carrier loop discriminator 310 is therefore typically a function of the phase and/or frequency error between the incoming satellite carrier signal and the replica carrier signal. Each $d_k$ signal is passed to the loop filter 312, which produces a control signal 326 into the NCO 314 to adjust the phase and/or frequency of the replica signals 316 and 318 accordingly.

In this manner, the carrier tracking loop 328 can track phase and/or frequency deviations in an incoming satellite signal, such as the exemplary signal 302. For example, if the carrier tracking loop 300 is locked in phase (i.e., the incoming satellite carrier signal is synchronized in phase with a replica carrier signal), the discriminator $d_k$ will be to close to 0 (i.e., $I_k$ is at maximum and $Q_k$ is nearly zero).

However, the exemplary carrier tracking loop 328 is typically nonlinear. That is, the carrier loop discriminator 310 typically outputs $d_k$ values that are proportional to phase and/or frequency errors between the incoming satellite signal and the replica signal only in a limited linear range. If the tracking loop errors exceed a certain limit due to high levels of CW and/or narrowband RFI present in the tracking loop pass band, the carrier tracking loop 328 may possibly lose lock. The carrier tracking loop 328 may also experience a phenomenon known as "cycle slipping", in which the loop slips one or more cycles of the tracked phase.

In general, cycle slips impede the accuracy of carrier phase measurements. Normally, it is not possible to measure the number of phase cycles of a satellite carrier wave between a receiver and the satellite at an instance of first observation. This unknown quantity is called integer ambiguity and requires ambiguity resolution in order to use the carrier phase measurements as range measurements. However, if a carrier tracking loop such as the exemplary loop 300 experiences a cycle slip, the ambiguity resolution should be executed again to obtain an accurate carrier phase measurement.

In one embodiment of the present invention, the RFI monitor 322 processes $d_k$ samples formed from in the carrier loop discriminator 310. The RFI monitor 322 may, for example, consist of a series of machine instructions executed by the microprocessor 320 to assist in detecting the presence of CW RFI and/or narrowband RFI in the tracking loop pass band. The microprocessor 320 may include data storage 324 having the RFI monitor 322 stored thereon.

Alternatively, the data storage 324 may instead be located in a physically separate location from the microprocessor 320, with a means for connecting the data storage and the microprocessor 320. In addition, the RFI monitoring functions could be carried out by a single processor such as the exemplary microprocessor 320 or could be divided over distinct entities located in the same functional unit or in physically separate units (e.g., a processor in a reference receiver and a processor in a ground station).

Moreover, while the RFI monitor 322 of the exemplary embodiment is a software module, other implementation schemes may alternatively be used, such as a firmware or hardware implementation. The software scheme described herein provides the most flexibility.

Figure 4:
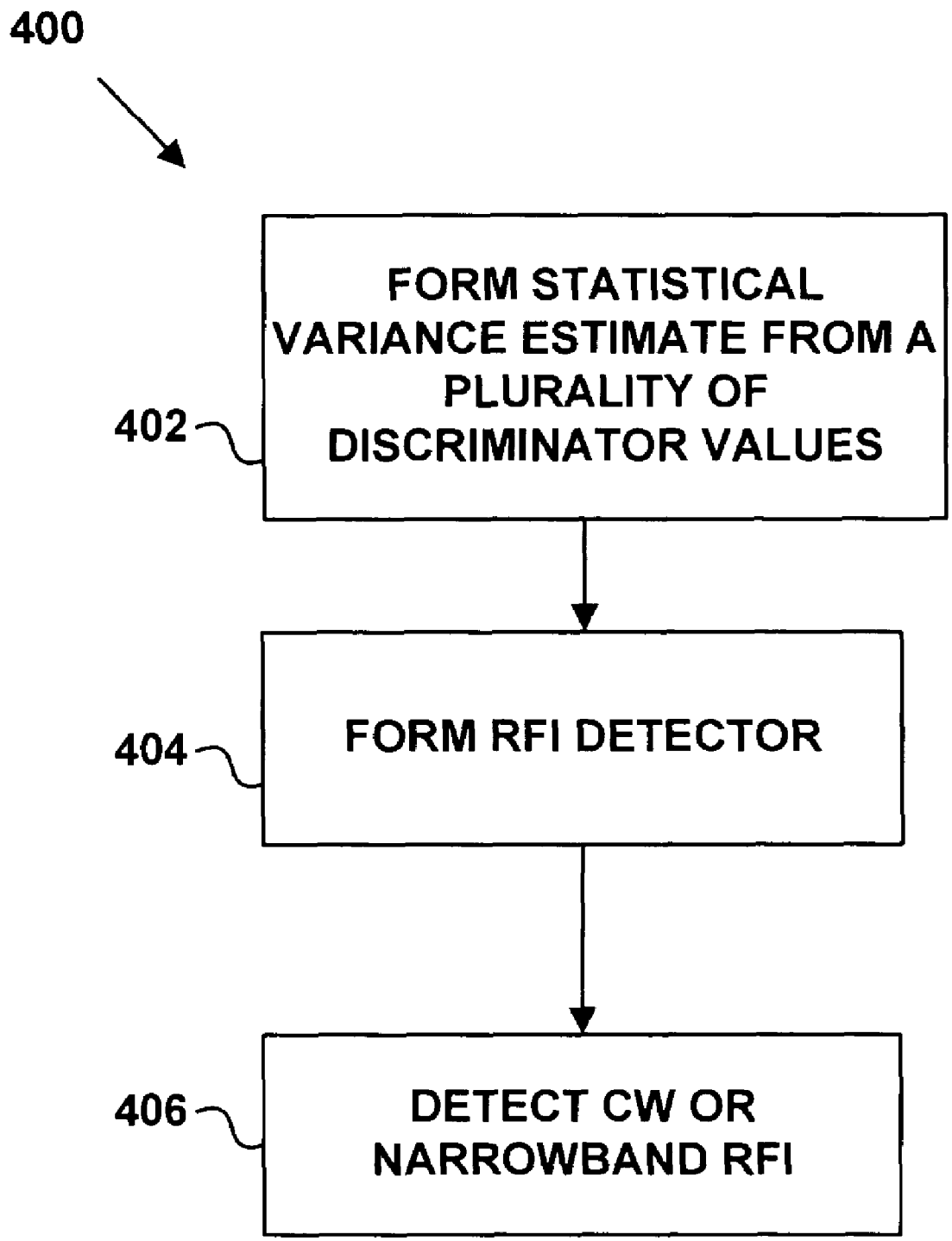
FIG. 4 is a flow chart diagram of a method for monitoring and detecting interference in a tracking loop pass band, according to an exemplary embodiment.

FIG. 4 depicts a flow chart diagram of exemplary RFI monitoring method 400, which may provide detection of CW and/or narrowband RFI occurring in a pass band of a tracking loop such as the carrier tracking loop 328.

At step 402, the RFI monitor 322 forms a statistical variance estimate V based on K discriminators $d_k$ formed in the exemplary carrier loop discriminator 310 at t=kMT, where k=1, ..., K. In a preferred embodiment K is equal to 100. The statistical variance estimate may be calculated in the form of:

$$V = c \cdot \frac{1}{K-1} \sum_{k=1}^{K} d_k^2 \qquad \text{(Equation 4)}$$

where c is a constant scaling the variance estimate to the desired unit of measure. Alternatively, the statistical variance estimate may be calculated with the following expression:

$$V = c \cdot \frac{1}{K} \sum_{k=1}^{K} d_k^2 \qquad \text{(Equation 5)}$$

The RFI monitor 322, at step 404, then forms an RFI detector $D_{RFI}$. The RFI detector is derived from the following expression:

$$D_{RFI} = \sqrt{V} \qquad \text{(Equation 6)}$$

As given by the Equation 6, the RFI detector may be calculated as a square root value of the statistical variance estimate V. As such, the $D_{RFI}$ value estimates the standard deviation of the discriminator $d_k$. Alternatively, the $D_{RFI}$ may be defined as the root-mean-square (RMS) value of the discriminator $d_k$.

At step 406, the RFI monitor 322 may detect CW and/or narrowband RFI. The RFI monitor 322 senses any CW and/or narrowband RFI induced conflict in the $I_k$ and $Q_k$ components processed in the discriminator 310 relative to the already tracked satellite signal. The nonlinear properties of the tracking loop may contribute to the efficiency of this RFI monitoring method. Typically the $D_{RFI}$ will exceed a threshold value if the exemplary carrier tracking loop 328 loses lock or a cycle slips due to abnormal levels of CW and/or narrowband RFI in the satellite signal being tracked.

In one embodiment, the RFI monitor 322 may compare the $D_{RFI}$ to a threshold value. Based on extensive tracking loop simulations, the threshold value is typically 0.6 radians for a phase-locked loop. Although a typical value of the threshold has not been predefined for a frequency-locked loop, one could be determined by performing tracking loop simulations (e.g., simulating loop response under various power levels and/or frequencies of CW and narrowband interferes).

While the threshold value is typically fixed, it may be adjusted slightly based on the measured signal-to-noise density ratio S/No (i.e., SNR normalized to the loop bandwidth and expressed in dB-Hz units) of a satellite signal. Typically this will be a post-correlation value of the S/No. Such adjustment may be needed to reflect changes in the satellite signal power caused by other unrelated effects such as antenna gain variations or multipath fading of the satellite signal.

For example, if it is determined that the gain pattern of the antenna system 202a of the RR 202 changed, the threshold value may be adjusted. The adjustment may be made based on the S/No averaged over a longer time frame (e.g., 1-10 seconds), for instance. Most receivers, such as the exemplary receiver 202b, provide an indication of an estimated value of the S/No. However, other more accurate techniques known in the art may be used to measure the S/No.

In addition to a loss-of-lock detection and a cycle slip detection due to CW and/or narrowband RFI, the $D_{RFI}$ value may in general reflect the presence of any CW and/or narrowband RFI in a tracking loop pass band. This could be especially useful when the levels of CW and/or narrowband RFI introduce large tracking loop errors that may have an adverse impact on the accuracy of the pseudorange and/or carrier phase measurements and may potentially lead to loss-of-lock conditions or cycle slips.

The detection of CW and/or narrowband RFI provided by the RFI monitoring method of the present invention may be useful in maintaining the accuracy and integrity of the exemplary LGF 200. In one exemplary embodiment, the RFI monitor 322 of the receiver 202b computes the $D_{RFI}$ every second for each received satellite signal based on the average of 100

$d_k$ samples (i.e., for T=0.001 second, k=100, and M=10, the kMT interval is 1 second). The computed $D_{RFI}$ values may be transmitted from the RR 202 to the DGPS cabinet 210 along with position and status of each satellite, pseudorange measurements and/or carrier phase measurements.

A one-second interval is equivalent to a typical navigational processing rate of most receivers (i.e., pseudorange/carrier phase measurements and/or independent PVT solutions are provided on a 1-Hz basis). However, the navigational processing rate may typically vary between 1-10 Hz, and is typically higher for receivers designed for aircraft precision approach applications, such as the exemplary receiver 202b of the RR 202. For example, the rate at which data is output from the RR 202 to the DGPS cabinet 210 may be 2 Hz or every 0.5 seconds. In this case, if the $D_{RFI}$ is calculated on a 1-Hz basis (or every 1 second), it may not be possible to transmit the value of the $D_{RFI}$ each time the data is sent to the DGPS 210.

In the alternative embodiment, the $D_{RFI}$ may be calculated in the DGPS cabinet 210. By way of example, if the RR 202 sends navigational measurement observables to the DGPS 210 at a rate of 2 Hz, the DGPS 210 may receive a sum of the squared discriminator values $d_k^2$ every 0.5 second based on 50 samples computed in the reference receiver. The DGPS cabinet 210 may then combine two of these sums to form the $D_{RFI}$.

However, the rate at which the discriminator values (or squared discriminator values) may be uploaded to the DGPS 210 may depend on the processing rate(s) of each reference receiver of the LGF 200 and many variants thereof are possible. The computation of the $D_{RFI}$ for each satellite signal reported by each of a plurality of reference receivers, such as the exemplary RR 202, RR 204, RR 206, and RR 208, may be carried out by the LGF processing unit 218 (or dedicated processor(s) within that unit, such as a differential correction processor and/or an integrity monitor processor), for instance. Other examples are possible as well.

In general, the LGF processing unit 218 may compare each $D_{RFI}$ value (as computed in the DGPS cabinet 210 or transmitted by the exemplary reference receiver along with a pseudorange measurement and/or carrier phase measurement) to a threshold value. The threshold value may be indicative of a loss of lock or a cycle slip of a carrier tracking loop in the reference receiver due to CW and/or narrowband RFI above tolerable levels. If the $D_{RFI}$ exceeds the threshold value, the LGF processing unit 218 may execute integrity processing to exclude the pseudorange and/or carrier phase measurement based on that satellite signal from the differential calculations.

In addition, the LGF processing unit 218 may generate RFI fault(s) or alarms to prevent any erroneous data from being transmitted to the airborne user 250. The RFI fault messages or alarms may be displayed on the MDT 212 to alert service personnel of potential RFI degradation in the LGF system. Depending on a severity and/or duration of measurement degradation due to CW and/or narrowband RFI as reflected by the $D_{RFI}$ values, the LGF processing unit 218 may possibly isolate one or more failed reference receivers until the alarm conditions are cleared. Other examples are also possible.

Furthermore, the $D_{RFI}$ measurements may be stored in the data recorder 224 (or any other internal and/or external non-volatile data storage) to collect time history of the $D_{RFI}$, and thus the standard deviation, over all system satellites. The time history can be used to quantify and assess the levels of CW and/or narrowband RFI the LGF 200 is exposed to.

While the implementation of the exemplary embodiment in the LGF 200 has been described, it should be understood that the present invention may be applied to any system (e.g., a standalone receiver or an integrated system) utilizing signals from a satellite-based positioning system such GPS, GLONASS, Galileo, WAAS, or European Geo-stationary Navigation Overlay System (EGNOS) that is required to monitor and detect abnormal interference levels in a pass band of a satellite signal. Other examples are possible as well.

As one example, the RFI monitoring method of the present invention may be beneficial in the LAAS airborne applications. The exemplary airborne user 250 may experience disruption in a satellite signal reception due to RF interferers during all phases of flight, including precision approaches and landings. For example, VHF channels that are used for voice and data communications between an airplane and an air traffic control center have narrowband harmonics with a bandwidth of about 25 kHz that fall within a GPS bandwidth.

The interfering RF signals may come from a VHF emitter located on board the same aircraft as a GPS receiver and/or a VHF emitter located on the ground. The emissions from the VHF on-board electronics can significantly interfere with GPS signals, degrading the accuracy of position determination. The harmonic emissions from the ground-based emitter could be potentially troublesome as the airplane approaches the ground during landing, for example.

In one embodiment, the exemplary RFI monitor 322 may be employed on board an aircraft such as the airborne user 250. The RFI monitor may detect any degradation due to abnormal levels of CW and/or narrowband RFI. The detection of the CW and/or narrowband RFI may be used to trigger correction of navigational measurements. For instance, if the $D_{RFI}$ exceeds a threshold value, a microprocessor such as the exemplary microprocessor 320 could recalculate and correct any inaccuracies in pseudorange and/or carrier phase measurements (e.g., the microprocessor may re-execute a carrier phase ambiguity resolution).

The detection of CW and/or narrowband RFI may be also used to alert a pilot (e.g., using RFI indicators in cockpit displays) if the satellite-positioning system cannot be relied on for navigational purposes. In such scenario, the pilot may revert to manual navigation techniques. Other alternatives are possible as well.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A method of monitoring radio frequency interference (RFI) in a satellite signal, wherein the satellite signal includes a carrier signal, the method comprising:
calculating a statistical variance estimate (V) based on a plurality (K) of discriminator values ($d_k$) formed in a carrier tracking loop; and
calculating an RFI detector from the statistical variance estimate.

2. The method of claim 1, wherein the statistical variance estimate is calculated in the form of:

$$V = c \cdot \frac{1}{K-1} \sum_{k=1}^{K} d_k^2,$$

wherein k is an index value from 1 to K and c is a scaling constant.

3. The method of claim 1, wherein the statistical variance estimate is calculated in the form of:

$$V = c \cdot \frac{1}{K} \sum_{k=1}^{K} d_k^2,$$

wherein k is an index value from 1 to K and c is a scaling constant.

4. The method of claim 1, wherein the RFI comprises continuous wave RFI.

5. The method of claim 1, wherein the RFI comprises narrowband RFI.

6. The method of claim 1, wherein the RFI comprises continuous wave RET and narrowband RFI.

7. The method of claim 1, wherein the carrier tracking loop comprises a phase-locked loop.

8. The method of claim 7, wherein the phase-locked loop is a Costas loop.

9. The method of claim 1, wherein the carrier tracking loop comprises a frequency-locked loop.

10. The method of claim 1, wherein the carrier tracking loop comprises a phase locked loop and a frequency-locked loop.

11. The method of claim 10, wherein the carrier tracking loop has a first mode of operation and a second mode of operation, wherein the first mode of operation is a phase-locked operation and the second mode of operation is a frequency locked operation, and wherein a first RFI detector is formed when the loop operates in the first mode and a second RFI detector is formed when the loop operates in the second mode.

12. The method of claim 1, wherein the RFI detector is defined as a root-mean-square (RMS) of the discriminator value.

13. The method of claim 1, wherein the RFI detector is derived from a square root value of the statistical variance estimate.

14. The method of claim 1, wherein each of the plurality of the discriminator values is formed at a periodic interval.

15. The method of claim 14, wherein the periodic interval is 0.01 seconds.

16. The method of claim 1, wherein K is 100.

17. The method of claim 1, wherein each of the plurality of the discriminator values is formed from in-phase and quadrature-phase components of the satellite signal.

18. The method of claim 1, further comprising determining whether a loss of lock of the carrier tracking loop has occurred by determining whether the RFI detector exceeds a threshold value.

19. The method of claim 18, wherein the threshold value is determined by simulating a response of the carrier tracking loop to CW and narrowband RFI.

20. The method of claim 19, wherein the threshold value is 0.6 radians.

21. The method of claim 18, wherein the threshold value is adjusted based on a signal-to-noise ratio of the satellite signal.

22. The method of claim 1, further comprising determining whether a cycle slip of the carrier tracking loop has occurred by determining whether the RFI detector exceeds a threshold value.

23. The method of claim 22, wherein the threshold value is determined by simulating a response of the carrier tracking loop to CW and narrowband RFI.

24. The method of claim 23, wherein the threshold value is 0.6 radians.

25. The method of claim 22, wherein the threshold value is adjusted based on a signal-to-noise ratio of the satellite signal.

26. The method of claim 1, wherein the carrier tracking loop is implemented in a receiver.

27. The method of claim 26, wherein the receiver comprises a plurality of tracking channels, each tracking channel for tracking one satellite signal, and wherein the RFI detector is calculated for each of the plurality of tracking channels.

28. The method of claim 1, wherein the satellite signal is selected from the group consisting of a GPS, GLONASS, Galileo, WAAS, and EGNOS signal.

29. The method of claim 1, embodied as machine language instructions stored on a machine-readable medium.

30. The method of claim 29, wherein the machine-readable medium is a data storage element readable by a microprocessor.

31. The method of claim 1, wherein the RFI is present in a pass band of the carrier signal.

32. The method of claim 31, wherein the RFI is present in a pass band of the carrier tracking loop.

33. A method of monitoring narrowband and continuous wave RF interference in a system comprising a plurality of satellites transmitting a respective plurality of satellite signals, at least one reference receiver and a ground station, wherein the at least one reference receiver receives the satellite signals from the plurality of satellites, the method comprising:

forming, for each satellite signal, a plurality of discriminator values ($d_k$) based on processing, in a carrier tracking loop included within one of the at least one of reference receivers, a carrier signal associated with the satellite signal;

calculating a statistical variance estimate (V) for each satellite signal based on the plurality (K) of discriminator values ($d_k$); and calculating an RFI detector from the statistical variance estimate.

34. The method of claim 33, wherein the statistical variance estimate is calculated in the form of:

$$V = c \cdot \frac{1}{K-1} \sum_{k=1}^{K} d_k^2,$$

wherein k is an index value from 1 to K and c is a scaling constant.

35. The method of claim 33, wherein the statistical variance estimate is calculated in the form of:

$$V = c \cdot \frac{1}{K} \sum_{k=1}^{K} d_k^2,$$

wherein k is an index value from 1 to K and c is a scaling constant.

36. The method of claim 33, wherein the step of calculating the RFI detector is carried out in the at least one reference receiver.

37. The method of claim 36, wherein the at least one reference receiver measures a pseudorange for each received satellite signal and transmits the RFI detector to the ground station along with the pseudorange, and wherein the ground station calculates differential corrections using the pseudorange transmitted from the at least one reference receiver.

38. The method of claim 37, wherein the ground station compares the RFI detector to a threshold value and excludes the pseudorange from the differential calculations if the RFI detector exceeds the threshold value.

39. The method of claim 38, wherein the threshold value is indicative of a loss of lock of the carrier tracking loop of the at least one reference receiver.

40. The method of claim 38, wherein the threshold value is indicative of a cycle slip of the carrier tracking loop of the at least one reference receiver.

41. The method of claim 33, wherein the step of calculating the RFI detector is carried out in the ground station.

42. The method of claim 33, further comprising: storing the RFI detector in a data storage element of the ground station; and quantifying the levels of the CW and the narrowband RF interference present in the ground station by evaluating a time history of the RFI detector over the plurality of satellites.

43. The method of claim 33, wherein the system is selected from the group consisting of LAAS, WAAS, and EGNOS.

44. A method for monitoring continuous wave and narrowband interference in a pass band of a satellite carrier signal, the method comprising in combination:
- means for estimating a statistical variance among a plurality of discriminator values formed in a tracking loop, wherein the tracking loop tracks the satellite carrier signal;
- means for calculating a standard deviation value from the statistical variance estimate;
- means for comparing the standard deviation value to a threshold value; and
- means for detecting an RFI fault when the standard deviation value exceeds the threshold value.

* * * * *